Aug. 4, 1953   N. J. SMITH ET AL   2,648,055
APPARATUS FOR DETECTING AND RECORDING MEASUREMENTS
OF SEISMIC, GRAVITATIONAL, AND OTHER FORCES
Filed July 11, 1951   6 Sheets-Sheet 1
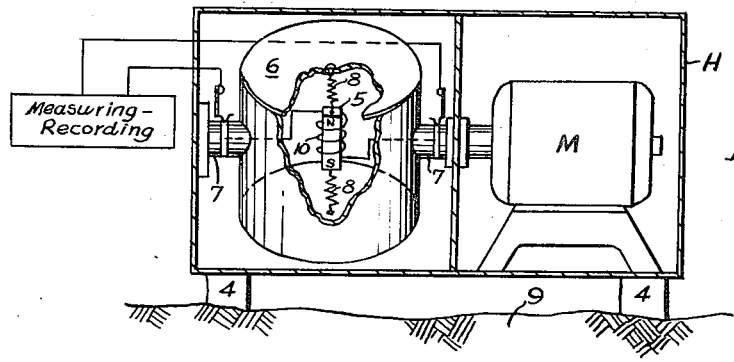
Fig. 1
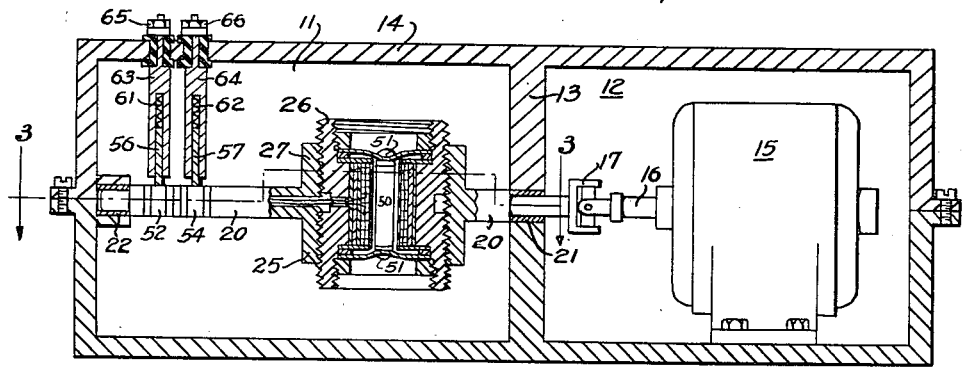
Fig. 2
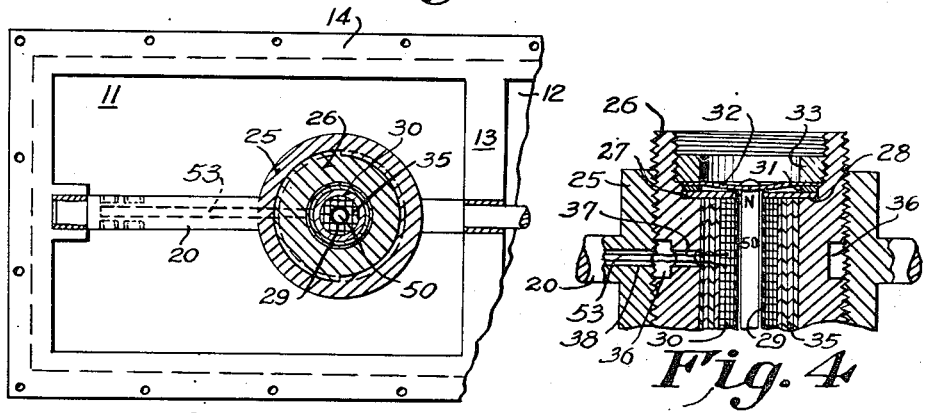
Fig. 3                        Fig. 4
INVENTORS:
NEAL J. SMITH &
ROBERTA I. SMITH,
BY  Mauro and Lewis,
ATTORNEYS Aug. 4, 1953     N. J. SMITH ET AL     2,648,055
APPARATUS FOR DETECTING AND RECORDING MEASUREMENTS
OF SEISMIC, GRAVITATIONAL, AND OTHER FORCES
Filed July 11, 1951                    6 Sheets-Sheet 2

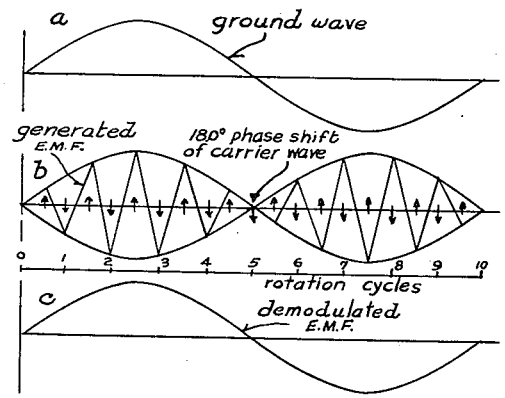

Fig. 5

ROTATION FREQUENCY HIGHER THAN
FREQUENCY OF GROUND WAVE

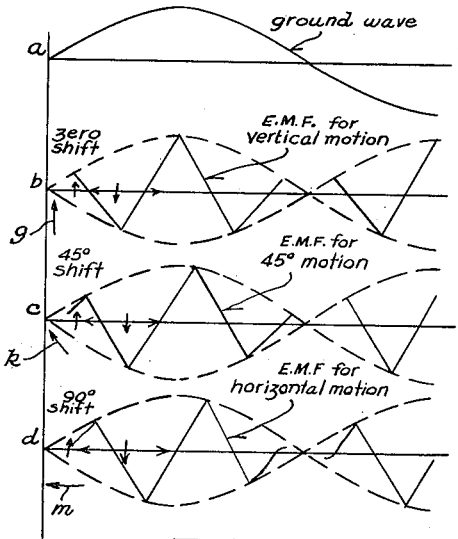

Fig. 6

CARRIER PHASE SHIFTING WITH
DIRECTION OF APPLIED MOTION

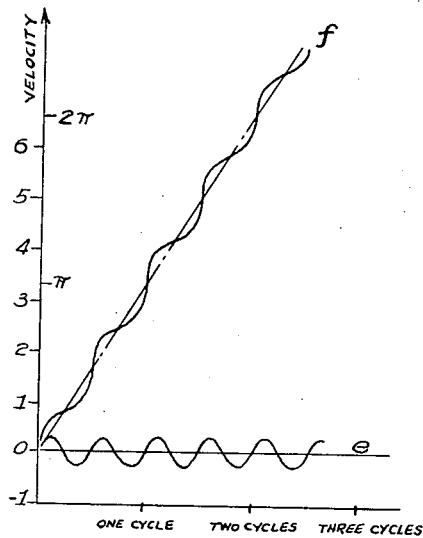

Fig. 7

ROTATION FREQUENCY
EQUALS APPLIED FREQUENCY

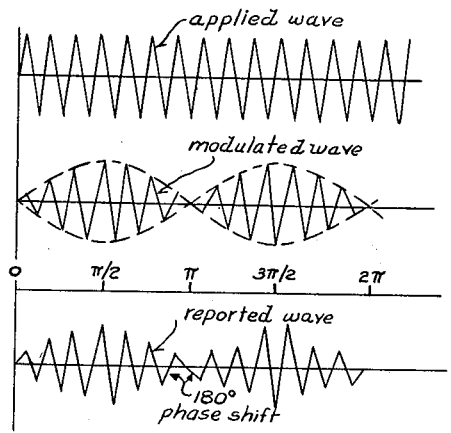

Fig. 8

APPLIED FREQUENCY GREATER
THAN ROTATION FREQUENCY

INVENTORS:
NEAL J. SMITH &
ROBERTA I. SMITH,

BY Mauro and Lewis,

ATTORNEYS

INVENTORS:
NEAL J. SMITH &
ROBERTA I. SMITH,

BY Mauro and Lewis,

ATTORNEYS

Aug. 4, 1953    N. J. SMITH ET AL    2,648,055
APPARATUS FOR DETECTING AND RECORDING MEASUREMENTS
OF SEISMIC, GRAVITATIONAL, AND OTHER FORCES
Filed July 11, 1951    6 Sheets-Sheet 4

INVENTORS:
NEAL J. SMITH &
ROBERTA I. SMITH,

BY Mauro and Lewis,

ATTORNEYS

Aug. 4, 1953    N. J. SMITH ET AL    2,648,055
APPARATUS FOR DETECTING AND RECORDING MEASUREMENTS
OF SEISMIC, GRAVITATIONAL, AND OTHER FORCES
Filed July 11, 1951    6 Sheets-Sheet 5

INVENTORS:
NEAL J. SMITH &
ROBERTA I. SMITH,
BY Mauro and Lewis,
ATTORNEYS

INVENTORS:
NEAL J. SMITH &
ROBERTA I. SMITH,

BY Mauro and Lewis,

ATTORNEYS

Patented Aug. 4, 1953

2,648,055

UNITED STATES PATENT OFFICE 2,648,055

APPARATUS FOR DETECTING AND RECORDING MEASUREMENTS OF SEISMIC, GRAVITATIONAL, AND OTHER FORCES

Neal J. Smith and Roberta I. Smith,
New Orleans, La.

Application July 11, 1951, Serial No. 236,201

15 Claims. (Cl. 340—17)

This invention relates to the detection and/or recording of seismic disturbances and other forces and especially to the recording of waves transmitted through the earth's crust and caused by seismic phenomena whether natural or man made.

The invention has for its general object a method and means for detecting and/or recording any movement in the earth's crust over a wide range of frequencies, wave types and wave directions and for differentiating between movements of different frequency, different wave types and different directions.

While the means according to this invention are particularly well suited for the detection of earth tremors or the like, they may also be used for detecting waves, such as sound waves or supersonic waves which are received through water or through air or through any solid medium other than the solid ground, and may also be used for the measurement of constant forces such as the force of gravity or centrifugal forces.

The invention and its objects are explained in the following detailed specification which refers to the annexed drawings. In these drawings, in addition to diagrams explaining the mode of operation of the invention, several embodiments of the apparatus constructed according to this invention are shown by way of example. It is, however, to be understood that the showing is illustrative only, and that the examples illustrated in the drawing were selected in order to explain the principle of the invention and the best modes of applying said principle. Other ways of applying the principles of the invention will be obvious to those skilled in the art, when following the directions contained in the specification, and modifications of the exmples shown are therefore not necessarily departures from the principle of the invention.

In the drawings:

Figure 1 is a diagram illustrating the principle of the invention and one form of the transducer means used;

Figure 2 is an elevational, sectional view of the invention in the form of a seismometer provided with the detecting and transducing means for two-dimensional reception according to the invention;

Figure 3 is a partial sectional plan view of the seismometer illustrated in Figure 2, taken on lines 3—3 of Figure 2;

Figure 4 is an enlarged partial section of the transducer of Figures 2 and 3;

Figure 5 is a diagram illustrating the principle of the modulation of the wave produced in the transducer by the seismic wave components received in the plane of rotation, the frequency of the wave produced in the transducer being higher than the frequency of the seismic or ground wave;

Figure 6 is a diagram illustrating the manner of distinguishing between different directions of arrival of seismic waves in the plane of rotation;

Figure 7 is a diagram illustrating the principle of reception of a seismic wave in the plane of rotation which is of a frequency equal to that of rotation;

Figure 8 is a diagram illustrating the detection of a wave in the plane of rotation, the frequency of which wave is higher than that of rotation;

Figure 11:
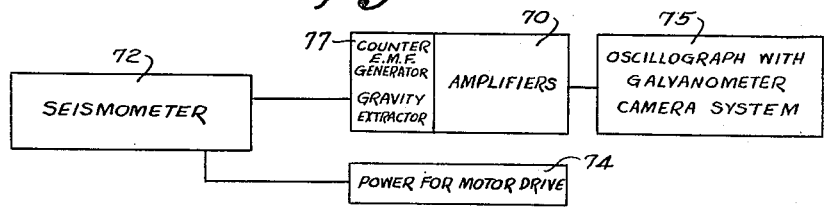
Figure 12:
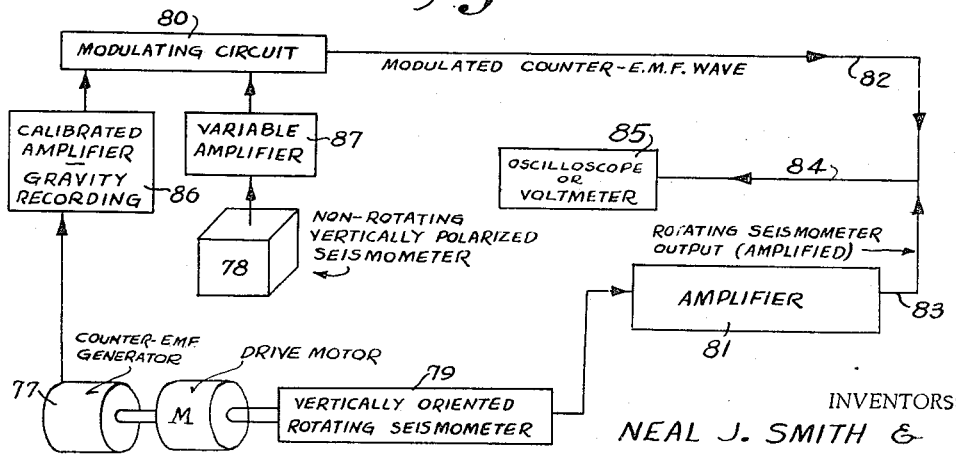
Figure 13:
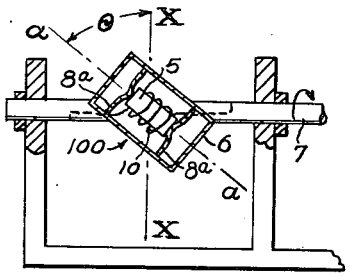
Figure 14:
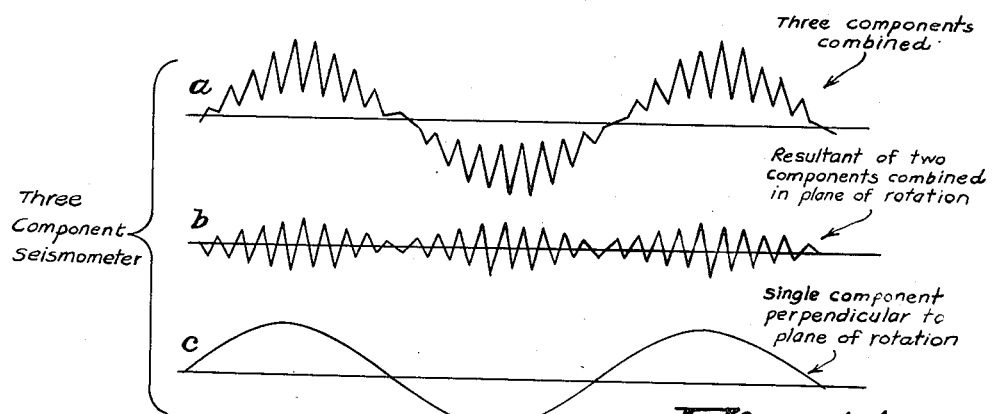
Figure 15:
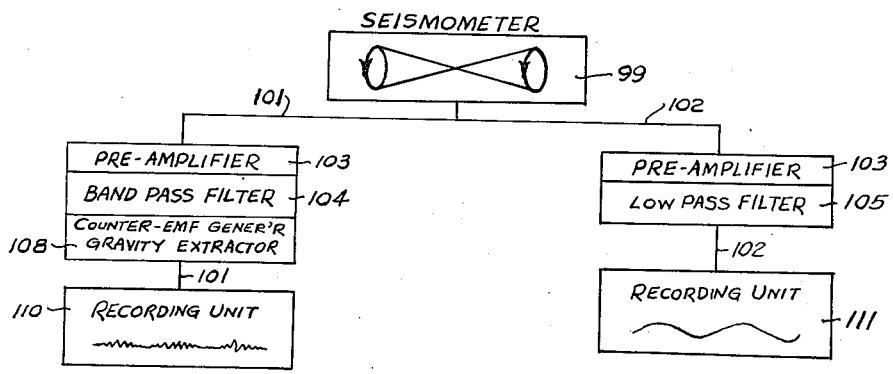
Figure 16:
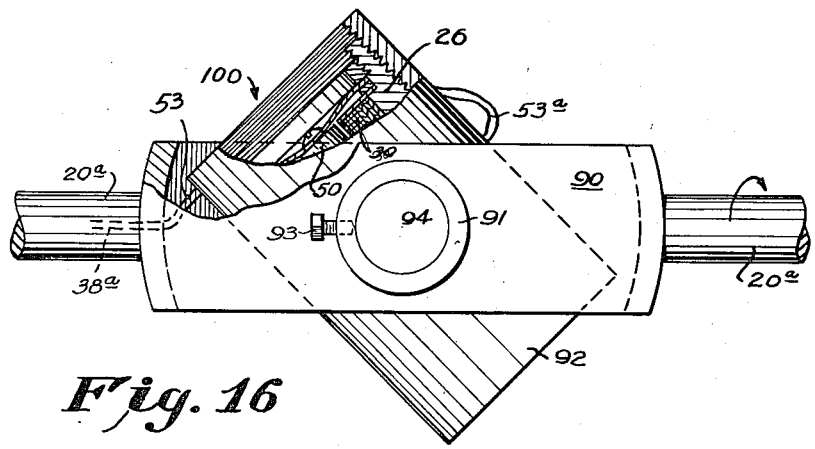
Figure 17:
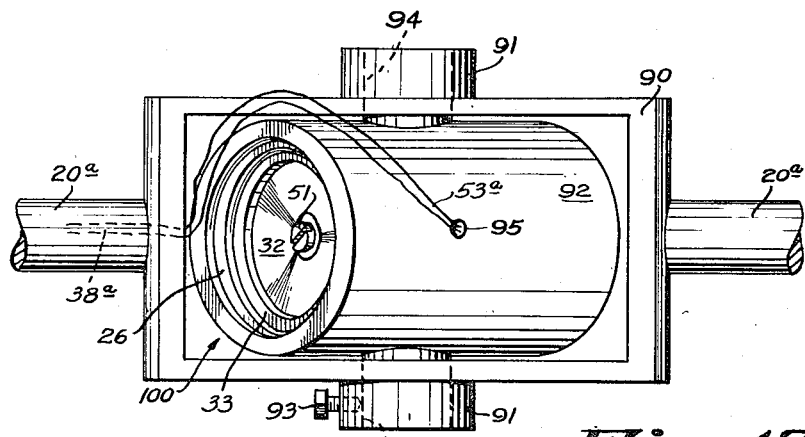
Figure 20:
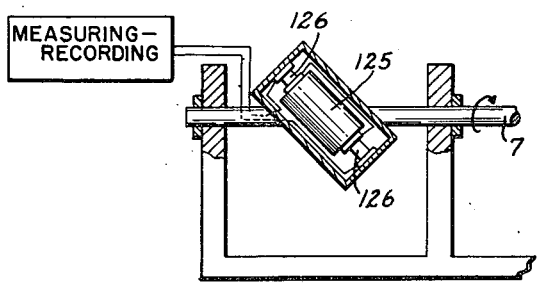
Figure 18:
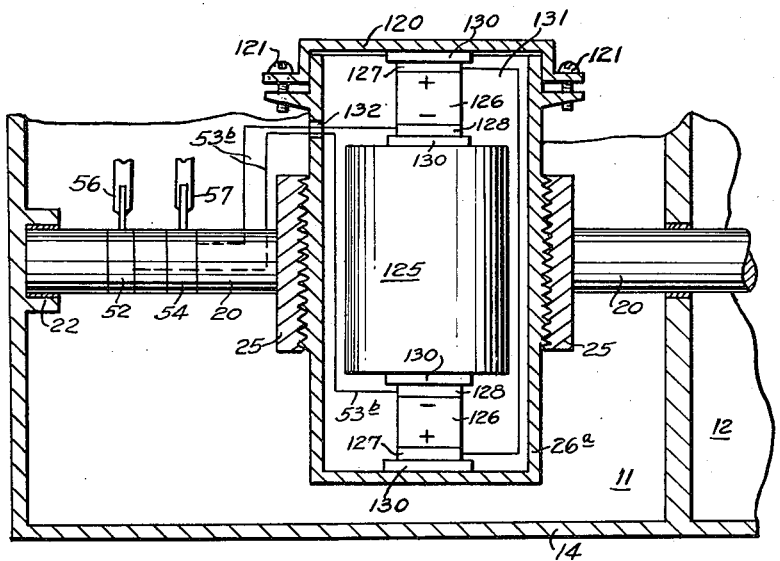
Figure 19:
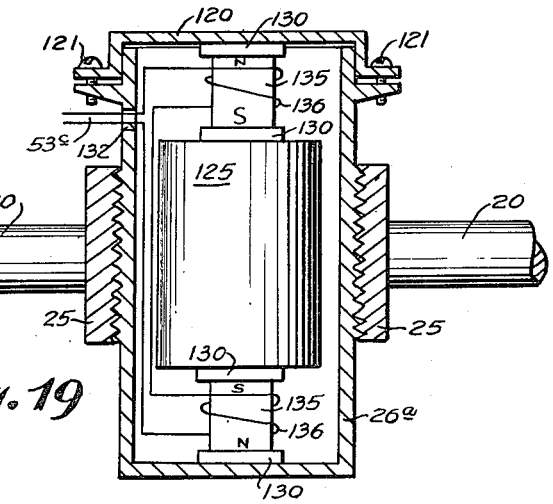

Figure 11 is a block diagram of an arrangement according to the invention which includes a generator, or other E. M. F. source, for producing an oscillation conteracting the influence of gravity in the transducer;

Figure 12 is a block diagram of an arrangement for measuring gravity illustrating the means for eliminating vertically acting seismic disturbances and other transients from the gravity measurement;

Figure 13 is a diagram illustrating the principle of orientation of the transducer modified according to the invention for three-dimensional sensitivity;

Figure 14 is a diagram illustrating the principle of modulation and the wave form generated according to the invention when using the transducer adapted for three-dimensional sensitivity;

Figure 15 is a block diagram illustrating the principle of separation of the signal developed by the axially directed component of wave motion from the signal generated by components active in the plane of rotation for the instrument having three-dimensional sensitivity;

Figure 16 is an elevational, partly sectional view of the rotatable transducer of the seismometer for three-dimensional sensitivity oriented according to the invention;

Figure 17 is a plan view of the rotatable transducer of the seismometer illustrated in Figure 16;

Figure 18 is an elevation, with parts in section, of a further modified form of the invention employing piezoelectric elements in the transducer;

Figure 19 is an elevation, with parts in section, of a further modified form of the invention employing magnetostrictive elements in the transducer; and Figure 20 is an elevation showing the piezoelectric form of transducer arranged according to the orientation principle of Figure 13.

Seismographs of all kinds are always provided with an inertia member which is resiliently mounted, and with a case or casing or other element which is fixed with respect to the ground, the detection of the waves traveling through the ground being the result of the difference in movement imparted to the two members in the event of a disturbance. On account of the lack of sensitivity inherent in all types of mechanical equipment, electrical seismic detectors have been developed in which electrical means for indicating a relative displacement between certain members are used. In these types of electrical seismic detectors the resiliently mounted inertia member may be a magnet suspended in springs and moving relatively to a fixed stationary coil. The relative movement between the two aforesaid members occurring in the case of a disturbance may then be electrically registered or recorded by means of the current induced by the magnet in the coil. Alternatively, registration or recording may be obtained by piezoelectric effects, or by capacitance changes produced by the small relative movement between the appropriate members, or by other recognized transducing means.

It will, however, be clear that with instruments of this known type certain directions of wave propagation, certain types of waves and also certain frequencies are favored or selectively preferred by a given instrument. Heretofore, the best way found to deal with the difficulties arising from such a preference was to develop specialized instruments for certain frequency ranges, wave types and wave directions, and to use a plurality of instruments for the detection of the disturbance. The costs of the construction and operation of such a set of instruments are high, and highly skilled and scientifically trained operators are necessary to read the instruments and to analyze the data furnished by them. It is, therefore, highly desirable to have a single instrument which combines the advantages of many instruments and which shows no preference for any special frequency, wave type or wave direction within some well-defined field of response.

One of the objects of the invention is therefore to provide a single instrument which is capable of registering without preference for frequencies, wave types or wave directions. An instrument of this type is of special value in seismic exploration where it is intended to study waves which have traveled through different geologic formations, as it is known, for instance, that geologically old formations absorb less high frequencies than geologically young formations. Ability to record the full frequency spectrum of the waves which have passed through geological formations will therefore provide valuable information and this is only possible if the apparatus used does not favor the reception of certain frequencies while being insensitive to other frequencies. The practical importance of a single non-selective and highly sensitive apparatus will thus be clear.

According to the invention, the inertia reactor is rotated at a constant speed and while rotating is made responsive either to oscillatory displacement or to the velocity of the displacement or to the acceleration or to the pressure imparted by the seismic waves. Non-rotatable electromechanical transducers for all of these four types of responsivity have been developed, and these known types of transducers may be adapted for use in connection with the invention. For the purpose of seismic prospecting, the preferred electromechanical transducer is usually of the type responding to velocity and, therefore, the modifications of a seismometer which will be described embody a velocity sensitive detector, it being, however, understood that such a device according to the invention may function as well with a displacement meter or with an accelerometer or with a pressure meter.

In the following specification, two modes of operation of the various instruments are described, one in which the instrument is sensitive only to wave motions or forces active in a given plane, hereinafter termed the mode of two-dimensional sensitivity, and another mode of operation in which the instrument is sensitive to wave motions or forces from any direction called three-dimensional sensitivity. Both modes of operation, as will be seen, can be derived from the same structure of the instrumentality through different adjustment of the position of the reactor.

In order to explain first the system which has two-dimensional sensitivity, reference may first be made to Figure 1 in which the basic arrangement is illustrated diagrammatically. A permanent magnet 5 is resiliently suspended within a closed case 6 which is rotatable around the axis 7 and driven with a constant rotational speed by motor M. The elastic suspension of the magnet 5 within the casing 6 is indicated diagrammatically at 8. The magnet forms the inertia reactor. It is surrounded by a coil 10 which is non-resiliently mounted in and rotatable with the casing 6 but which coil is not connected with the magnet. In this arrangement, the magnetic axis passing through the poles of the magnet and the axis of the coil are radially directed and at right angles to the axis of rotation, an arrangement which produces the two-dimensional sensitivity.

In Figure 1, the instrument and motor are both contained in a housing H and may be attached to the ground 9 (in the event of making measurements of seismic forces) by suitable means such as standards 4. The lead wires from coil 10 are suitably conducted without the casing 6 and the housing H to measuring-recording instruments, this arrangement being diagrammatically shown in Figure 1 but further shown and described hereinafter in detail.

Obviously, any ground motion (transmitted mechanically to the rotating casing 6) produces a relative movement of the magnet with respect to the casing and to the coil. A movement of the magnet in its turn produces an E. M. F. in the coil under certain well defined conditions.

It will be clear that this device is completely insensitive when the movement occurs in the direction parallel to the axis of rotation. It will also be clear and will be explained below that the device is equally sensitive for all other directions. The insensitiveness, with respect to any motion transmitted in the direction of the axis of rotation or at right angles to the plane of rotation, will be readily understood when considering that such a movement displaces the magnet while it remains parallel to its initial position and to the coil axis. The magnet therefore merely moves transversely within the interior of the coil, a movement which does not generate an E. M. F. in the coil.

However, any movement of the magnet occurring within the plane of rotation and toward the axis of rotation produces a radial movement of the magnet within the coil and therefore generates an E. M. F. within the coil.

The nature of the electrical responses of the device according to the invention depends, however, on the relative frequencies of the detected ground motion with respect to the frequency of the rotational movement.

If the frequency of the detected motion is lower than the frequency of the rotation, the electrical response of the device will be in the form of an undulating carrier wave with the carrier frequency being the frequency of rotation and the modulation being due to the external force which has been applied. This case is shown in Figure 5, illustrating the ground wave at 5A, the generated E. M. F. at 5B and the demodulated E. M. F. at 5C, respectively. The degree of modulation in this case expresses the character of the ground motion active in the plane of rotation.

Since the carrier wave, formed by the fluctuation of the E. M. F. during the rotation of the device, has a zero amplitude when the magnet is in the center and does not move, it will be clear that there is no output from the system until an external force is applied in the plane of rotation which produces the motion of the magnet. Therefore, the carrier wave is always "overmodulated" and the waves on both sides of a node, while of equal amplitude, are out of phase by 180° and each node is therefore a point of 180° phase shift for the carrier wave. (Figures 5 and 6.)

Further, the phase of the carrier wave with respect to a reference phase is dependent upon the direction of action of the modulating waves. As best seen in Figure 6, disturbances (shown by arrows G and K) arriving in the plane at an angle of say 45° from each other (Figure 6, B, C) produce a phase shift of ⅛ of the wave length of the carrier wave with respect to a reference phase. Disturbances (arrows G and M) arriving in the plane of rotation at an angle of 90° from one another (Figure 6, B, D) produce a phase shift of ¼ of the carrier wave length and so forth. Therefore, while all disturbances arriving in the plane of rotation produce the same effect in many respects, a definite indication of the direction in which they arrive or act is obtained by observing the relative shifting of the phase of the carrier waves in respective nodes.

As a result, the instrument can indicate the direction of approach of a disturbance when the type of wave motion is known and, conversely, when the direction of approach is known the instrument can distinguish between longitudinal, transverse and elliptical wave types of wave motion, arriving in the same plane. This is an indication, obtainable by the instrument constructed according to the invention, which hitherto was obtainable by using a combination of instruments only.

When a constant force, or when a force of very low frequency acts on the inertia mass, this mass does not—as it would seem at first sight—move outwardly until it reaches a limit. As long as the rate of rotation is well in excess of the frequency of the applied motion, or in the case of non-vibrating impulses, as long as its rotation is rapid with respect to the time of application of an impulse, the inertia mass can only vibrate about its position of rest. This follows from the fact that the inertia mass faces the direction of the impulse twice for each cycle, in opposite direction. The mass may start to move radially in one direction, but immediately afterwards faces the other way and must move to the other side. Therefore, also with a constant or very slow impulse a vibration results which does not entail a unidirectional movement of the mass. It is thus clear that the instrument may be used for measuring low frequency or constant forces such as the force of gravity, which forces produce an alternating E. M. F. having the frequency of rotation and having an amplitude expressive of or proportional to the magnitude of the constant force.

In the event that the frequency of the detected ground motion should be equal to the frequency of rotation and if, moreover, the two movements are in phase, the inertia reactor receives a number of pulses forcing it outwardly in a radial direction, all these pulses being in one direction only. The inertia reactor will thus be moved to the limit of its movement. During this movement, a unidirectional, somewhat pulsating, current is produced, the pulsations representing the single impulses which are received (see Figure 7, wave f). These steps or pulses will occur at a frequency which is twice the frequency of rotation.

The above case corresponds to the condition producing resonance in the conventional seismometer. The incoming energy will be registered in this case in a very distinctive manner, and the energy from a number of weak signals can be compounded to significant proportions. It will also be noted that the instrument in this case behaves in a manner which is physically different from the manner in which conventional seismometers operate under resonance.

If the frequency of the received ground motion is equal to the carrier wave frequency, but is out of phase with the same, for instance with a phase difference of 90°, the inertia reactor oscillates around the center position with twice the frequency of rotation. The resulting electric response amounts therefore to a doubling of the frequency of the carrier wave which continues as long as the disturbance lasts (Figure 7, wave e).

In the event that the frequency of the received disturbance should be higher than the frequency of the carrier wave (see Figure 8), these higher frequencies will only be registered fully during periodically recurring intervals which correspond to those instants, in which a component of the velocity in the plane of rotation is parallel to the direction of maximum sensitivity which is also the direction in which the magnet moves within the coil. These intervals occur twice during each rotation; between these positions the amplitudes of the E. M. F. induced in the coil falls to zero. The theoretical zero position is reached when the components of the velocity received in the plane of rotation are at right angles to the direction of maximum sensitivity. Therefore, for a continuous reporting of such higher frequencies two instruments at right angles to each other (or three instruments arranged at 120° from each other, etc.) will be necessary, each reporting and recording separately. In such a case, of course, it will not be necessary to use complete instruments, but merely two or more casings in which suspended magnets and fixed coils are all arranged in the same plane of rotation and are all rotating at the same speed but are angularly spaced in the manner indicated.

It follows from the above that in a device according to this invention, if seismic frequencies below the frequency of rotation are recorded, the same type of response is obtained for all frequencies. As the polarity of the magnet with respect to the direction in which the displacement occurs, or in which a motion to be detected progresses, is reversed twice during each rotation, the reaction of the inertia reactor with respect to the differential effects of the disturbance is always the same whatever the frequency and whatever the direction of the disturbance within the plane of rotation.

It should be further noted that all suspension systems in all types of seismometers hitherto known impress their own natural vibration characteristics on the record. However, in the instrument according to the present invention, this tendency is eliminated by the rotation of the system. It will be clear that this is a very marked advantage over all known systems, as most seismometers must be used in a state of critical or near critical damping in which they return asymptotically into their position of rest without oscillation. Such damping is necessary in whole or in part in order to prevent a sustained vibration of the movable members with their own frequency after receiving one impulse. Sustained vibration would obliterate subsequent impulses and may also give rise to damage in the case of unusually strong impulses arriving.

The loss of sensitivity resulting from such damping is, however, severe and constitutes a major disadvantage especially on account of the fact that the loss of sensitivity is selective and is therefore not the same for all frequencies. Moreover, the recording of low frequencies in particular requires a natural frequency in the seismometer lower than the frequency to be recorded and this can be effected in seismometers of the usual type only by increasing the mass of the inertia reactor to the point where the instrument may become unwieldy and unsuitable for field use. The seismometer according to this invention is distinguished by the fact that it can be so operated that the natural frequency may be made very low while the mass of the inertia reactor is kept conveniently small. For a given mass of the inertia reactor and given spring constants there will be a rate of rotation at which the natural response frequency of the seismometer according to this invention becomes zero. This makes the device equally responsive to all frequencies, however low, and makes restraints such as damping unnecessary.

Figure 9:
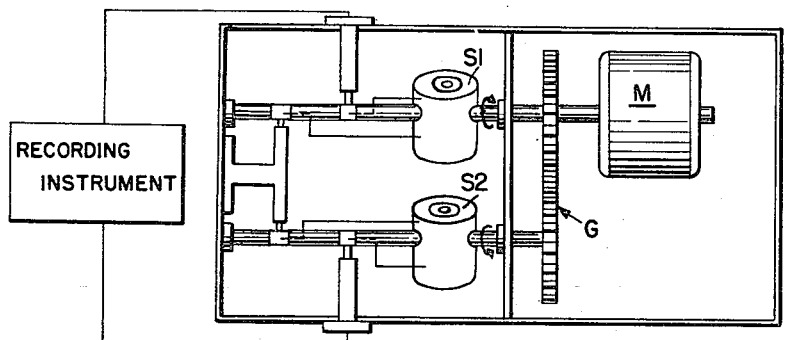
Figure 9 is a diagram illustrating the use of two detecting units, each unit rotating at equal speed in opposite directions.

Referring to Figure 9, if a response to a ground motion in a particular direction is thought to be desirable, this may be obtained, according to the present invention, by means of two rotating seismographs $S_1$, $S_2$ placed near each other and driven with the same speed in opposite directions, for instance by motor M and gear mechanism G. The two outputs are so coupled that the voltages or currents (whichever is measured) add up algebraically in the indicator circuit. There will be then one direction in which the electrical values have the same polarity and another direction at right angles thereto in which the electrical values oppose each other. In the first direction the output will be twice the output of a single seismograph and in the other the output will be zero. Obviously, the combined instrument is thus selective for the first mentioned direction. The selected direction can be shifted by adjusting the phase between the two systems.

The actual constructional details of an instrument for the two-dimensional mode of operation, corresponding to the principles illustrated in Figure 1 are shown in Figures 2, 3 and 4. Referring especially to Figure 2, the outer casing of the device is indicated by numeral 14, the same being divided into two compartments 11 and 12 by an internal wall 13. The right-hand compartment 12 contains the electrical driving motor 15 having a shaft 16 connected as by a universal joint 17 to the shaft 20 of the sensing unit. Shaft 20 is supported by bearings 21 and 22.

Integral with, or secured to, shaft 20 between its ends is an internally threaded cylinder 25 within which is threadedly received the main body 26 of the sensing element, this threaded relationship permitting a precise adjustment of the unit's position with respect to the shaft 20, for balancing purposes. As best shown in Figure 4, the body 26 has an internal bore which is widened out to provide a shoulder 27 somewhat inwardly of each end of the body, and upon this shoulder rests a washer or the like, 28, of non-magnetic material. Between these two washers is clamped a thin tube or cylinder 29 of insulating material upon which the coil winding 30 is wound, the tube thus providing a bore within which the permanent magnet 50 is supported in a manner to be described.

The washers 28 are clamped upon their respective shoulders 27 by the pressure of a spacing ring 31 upon which is supported the periphery of a thin, flexible metallic diaphragm spring 32, all of these parts being clamped in place by the pressure exerted by a ring or collar 33 threaded into each of the opposite ends of the body 26, so that magnet 50 is suspended for restrained axial movement within the bore of coil support form or tube 29, in a manner quite similar to that shown diagrammatically in Figure 1. The permanent magnet 50 is suspended between the opposite spring diaphragms by having its opposite ends fastened thereto as by screws 51 (Figure 2).

The winding of coil 30 surrounds and is carried by the insulating tube or form 29, and surrounding this winding (which is of course insulated) are several layers of magnetically permeable sheet material 35, these forming a magnetic armature about the coil 30, and serving to provide a magnetic flux path extending from magnet 50 through the winding or coil. Thus, an efficient magnetic circuit for coil 30 is obtained.

In order to make the necessary external connections to the coil 30, the body 26 has an annular recess or groove 36 (Figure 4) cut into its outer wall, and a bore 37 connects this groove with the space occupied by the armature material and the winding 30; obviously, a suitable hole or bore through the magnetic sheet material 35 is also provided. The connecting wires 53 thus lead from coil 30, through the armature material 35, bore 37 and into groove 36, and thence through a bore 38 in the shaft 20 to the slip rings 52 and 54 (Figure 2). The connecting wires are given an excess of length, the surplus being held in the recess 36 and enabling sufficient rotation of the body 26 within the cylinder 25 to accomplish the desired balancing adjustment with respect to the axis of rotation.

Slip rings 52, 54 (Figure 2) are insulated from the shaft by suitable insulating sleeves or bushings. Brushes 56, 57 are applied against said slip rings 52, 54 and may be pressed against them by means of springs 61, 62 inserted into suitable bores of the brush holders 63, 64 which are held in the casing 14. The holders may be provided with terminal posts 65, 66. These posts project outwardly through insulating bushings mounted in suitable bores of the casing.

Various circuit arrangements adapting the two-dimensional form of the device to various purposes, will now be described with reference to Figures 10-12.

The E. M. F. or current induced in the coil of the seismometer 72 as shown diagrammatically in Figure 10, passes an amplifier 70 which may also contain filters, if necessary, and the amplifier is then connected with the usual galvanometer-camera system 75 which will record the oscillations of a galvanometer on a photosensitive paper. The source of power energizing the motor driving the seismometer shaft is indicated at 74.

Figure 10:
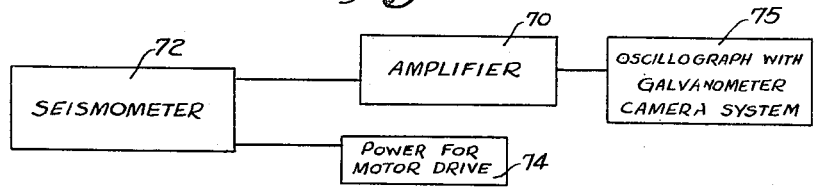
Figure 10 is a block diagram of an arrangement in which the influence of gravity in the plane of rotation is negligible as a result of orientation.

It will be clear that this Figure 10 arrangement can be used, such as it is, for the detection of seismic waves or vibrations when the plane of rotation of the transducer is horizontal or substantially horizontal. When the plane of rotation is not substantially horizontal, the force of gravity acting on the system generates an oscillation of constant amplitude for any particular orientation of the plane. The amplitude of the oscillations thus produced is very large when compared with most seismic disturbances. The superposed gravity wave, while not interfering with the pattern of the seismic waves to be measured, nevertheless causes some inconvenience and is preferably eliminated as indicated in Figure 11 in order to make the records of the transients clearly readable.

In the event that the single seismometer 72 of Figure 11 is used in a non-horizontal position, the cancelation or elimination of the oscillation caused by gravity may be obtained by means of a generator 77 driven by the seismometer shaft or by the electric motor driving the seismometer, said generator producing a counter E. M. F. of the same magnitude and wave form but in opposition to the E. M. F. which has been produced by the influence of gravity.

In the event that a plurality of seismometers, all running at the same speed, are used, a single source of counter E. M. F., such as a generator 77, may be arranged which counteracts the oscillations due to gravity of all the seismometers.

In the event that the measurement of the force of gravity is desired and not the measurement of seismic waves or of other transients, it will be clear that the optimal position for the plane of rotation is the vertical plane. The measure of the gravity generated wave may be obtained in terms of the counter E. M. F. supplied, if the counter E. M. F. supply system is adjustable and is suitably calibrated. The amount of counter E. M. F. required to exactly cancel or counterbalance the gravity wave will be a measure of the relative force of gravity at the particular location and time.

In the event that the force of gravity is to be measured, it will be obvious that transient or periodic disturbances such as set up by earthquakes (man-made or natural) or by winds, waves, traffic, the operation of heavy machinery nearby, and the like, may, if of sufficient magnitude, interfere with the measurement of the gravity force, as it is more difficult to determine the exact amount of counter E. M. F. required to eliminate the gravity generated wave when a combined oscillation is produced. In such cases, it will be of advantage to attenuate or eliminate transient or periodic disturbances. As an instrument for two-dimensional sensitivity is already insensitive to axially directed forces as above explained, and as the plane of rotation is vertical, when the measurement of gravity is desired, disturbing forces acting in the horizontal direction at right angles to the plane of rotation will be ineffective. In order to be able to obtain an indication which does not contain all the transients occurring in the plane of rotation, according to the invention, the output of a pair of oppositely rotating, co-planar seismometers is combined so that there will be one direction in the plane in which the output of the pair will be zero due to mutual cancelation in that direction while in another direction at 90° from the first mentioned direction the output will be doubled.

One direction exists therefore in the plane of rotation in which the disturbing forces are ineffective. It is of course preferable, as stated below, to select the direction in which the disturbing forces are ineffective in such a manner that it is in a horizontal plane. On account of the insensitivity of the instrument to disturbances which are parallel to the (horizontal) axis of rotation of the seismometer shafts, the two directions of ineffectivity which exist for the arrangement described, define a horizontal plane which is therefore free of all disturbances.

The selection of a horizontal plane in the event that gravity measurements are made is, of course, essential in arrangements of the type specified, as the elimination of a disturbing force or of a component of the disturbing force in a vertical plane would also eliminate partly or entirely the registration or indication of the force of gravity.

However, it may be desirable to eliminate vertical transient or periodic disturbing forces without influencing the gravity generated signal wave. This result can be obtained by using the apparatus which is diagrammatically illustrated in Figure 12.

This object is carried into effect by using a known non-rotating, vertically polarized, seismometer 78 the signal currents of which are amplified in an adjustable or variable amplifier 81 and are used for modulating the oscillations produced by the generator 77 which generates the E. M. F. used to counterbalance or annul the gravity wave produced in a rotating seismometer 79.

The modulation of the oscillations produced by the generator 77 is obtained by means of any known modulation circuit arrangement 80. Before entering the modulator circuit, however, the output of the generator 77 passes calibrated variable amplifier 86. Amplifier 86 will include a calibrated adjusting device on which gravity values are read in terms of counter-E. M. F. supplied.

The generator 77 is driven by the motor M which also drives the shaft of the rotating seismometer 79. The rotating seismomter is so arranged that the plane of rotation of the inertia mass is a vertical plane. The oscillation generated in said seismometer therefore includes a gravity wave.

The output of the seismometer 79 passes the amplifier 81 and is fed by means of line 83 to a line 84 which is also connected with the output line 82 of the modulator 80. The line 84 therefore contains both outputs which have been mentioned above. It leads to a voltmeter, oscilloscope or other indicator permitting observation of the (algebraic) sum of the E. M. F.'s which are fed to the line 84.

The modulated wave resulting from the modulation of the gravity counteracting wave of generator 77 by the wave produced in the non-rotating seismometer 78 by the disturbing force may be made equal to the modulating wave which is produced by the disturbing force in the vertically orientated rotating seismometer 79. The equality is obtained by adjusting the variable amplifier 87, thus controlling and adjusting the degree of modulation in such a manner that the disturbances arising from vertical transients cancel each other. Such cancellation occurs because the two modulated waves are exactly 180° out of phase.

When such cancellation occurs (a condition which may be easily observed by lack of fluctuation in voltmeter 85), the calibrated variable amplifier 86 may be adjusted so that the counter-E. M. F. supplied will exactly cancel the gravity generated wave from rotating seismometer 79 (a condition in which voltmeter 85 reads zero). The gravity force can then be read from device 86 in terms of the amount of counter-E. M. F. so supplied.

It will be understood that exact cancellation of vertical transients can only take place within that range of frequencies for which the non-rotating seismometer has a flat response. Non-rotating seismometers have a flat response to frequencies which are either lower or higher than the natural frequency of the seismometer itself. Hence, there is a range of frequencies in which the cancellation will be less efficient and will be only partial for any particular seismometer, but by attention to the characteristics of the non-rotating, conventional seismometer this range can be shifted to cover that frequency zone in which the disturbances are less likely to occur.

The above mentioned system which has been described as cancellation or attenuation of vertically disturbing transients or periodic forces can be applied without change to horizontally directed disturbing forces or, by combination of a pair of such systems properly oriented, can be used for the cancellation of vertical and horizontal disturbing forces simultaneously, thus eliminating the need for the combination of the outputs of a pair of oppositely rotating, co-planar seismometers for the elimination of horizontally directed disturbances.

The elimination of the effects of disturbing transients or periodic forces from the device when used to measure gravity is clearly an advantage in that it will permit measurements of gravity or other steady forces under disturbing conditions which prevent the operation of conventional gravity meters, such as operation near factories, heavy traffic, in high winds, on ship-board, or while operating on a vehicle in motion.

The transducer according to a modified form of the invention may also be constructed to be responsive in all three dimensions of space instead of being responsive only to disturbances occurring in one selected plane which, as above explained, is the plane of rotation of the transducer around an axis, the effect of axially directed disturbances being zero. A three-dimensional sensitivity of a rotating seismometer therefore means that the transducer must be responsive not only to disturbances or forces or components of the same acting within the plane of rotation, but also to disturbances or forces or components of the same acting in a direction which is parallel to the axis of rotation. To obtain this result the transducer is so arranged that it is inclined with respect to the plane of rotation so that the effect of axially directed components of disturbances or forces is no longer nil.

The arrangement of a transducer 100 of this type with respect to the rotating shaft is diagrammatically indicated in Figure 13.

In this figure, certain reference numerals are the same as those indicated in Figure 1. The magnet 5 is surrounded by a coil 10 and is suspended between resilient members 8A which are held in a casing 6, mounted on and rotated by a rotating shaft 7. However, the polarity axis N—S which is coincident with the axis $a$—$a$ of the transducer 100 is inclined at an angle $\theta$ with respect to the vertical axis $x$—$x$ and the axis $a$—$a$ therefore describes during rotation a conical surface the apex of which is located in the point of intersection of axis $a$—$a$ with axis $x$—$x$.

The magnet 5, held by the resilient elements 8 moves within the casing 6 along the axis $a$—$a$ and, as this axis describes the aforesaid conical surface during rotation, the direction in which the transducer is sensitive is always a generatrix of the cone. For the sake of simplification, it has been assumed that the magnet is always held by the resilient members in such a manner that it moves along the axis $a$—$a$ of the transducer, but is prevented from moving in a transverse direction.

It will be understood that the sensitivity of the transducer in any given direction is a function of the angle $\theta$. When $\theta$ is zero, there is no reception in the axial direction, as this case is then identical with the aforedescribed case of two-dimensional sensitivity, while in the event that $\theta$ is 90°, reception occurs solely in the direction of the axis of rotation. The angle of inclination of the axis $a$—$a$ of the magnet of the transducer with the plane of rotation of any given point must therefore be intermediate between 0° and 90° to obtain the three-dimensional responsivity explained above. The selection of the exact angle depends on the ratio which the responses in the aforementioned directions should have, on the rotational speed and also on the elastic properties of the holding means for the magnet.

Considering now the response of the rotating transducer to components of disturbances or forces acting in the plane of rotation and to components in the direction of the axis of rotation, it will be clear that the two types of components will produce different effects. With respect to any force or disturbance or the component thereof acting in the plane of rotation the polarity of the magnet changes constantly on account of the rotation of the magnet, the frequency of this change being that corresponding to the speed of rotation. The signal will therefore be of the character already described in connection with the modification of the transducer which was termed two-dimensionally responsive, and only the magnitude of the response will change in proportion to the angle of inclination of the transducer. However, no change of polarity occurs in the direction parallel to the axis of rotation and the report of the transducer to components of disturbances acting in this direction will therefore consist in a signal varying directly in proportion or as a function of the variation of magnitude of the said component. Oscillatory disturbances or forces which have components in a direction along the axis of rotation and at right angles thereto therefore produce a combined oscillatory signal consisting of the superposition of the two oscillatory signals produced in the two directions mentioned. The diagrams of the two wave signals are shown in Figure 14, the middle diagram 14B showing the response to components in a plane perpendicular to the axis of rotation and the lower diagram 14C illustrating the response to the component acting in the direction of the axis of rotation. The combined oscillatory signal is shown in the top diagram 14A.

The instrumentality to be used for recording and analyzing a disturbance arriving from any direction has therefore to be provided with means for decomposing the oscillatory signal which is of the character shown in Figure 14A, from the component oscillations such as shown in Figures 14B and 14C, respectively.

The three-dimensional arrangement consists of a transducer 100 such as illustrated in detail in Figures 16 and 17, mounted on a seismometer shaft 20A which is journaled and driven in the manner illustrated in Figures 2, 3 and 4, and which is also provided with slip rings and brushes (not shown). The transducer 100, however, is not directly mounted in a support, but is carried within a supporting frame 90 which may form part of the shaft 20A and which therefore rotates with the said shaft. The supporting frame 90 is provided with bearing sleeves 91 projecting from the frame.

The transducer 100 is of a construction which corresponds to the construction illustrated in Figures 2, 3 and 4, with the particular difference that the case 26 is supported within a cylindrical threaded sleeve 92 provided with trunnions 94 which are journaled in the bearing sleeves 91. Their position may be fixed by means of a set screw 93. The inclination of the transducer axis with respect to the axis of rotation may therefore be adjusted by bringing the transducer 100 into the desired position within the frame and by fixing said position by means of set screw 93.

In sleeve 92 a bore 95 may be provided, connecting with the annular recess 36 (see Figure 4) through which the wires 53A from the coil 30 are conducted to the entrance of bore 38A of shaft 20. Obviously, wires 53A should be given sufficient slack to permit the aforesaid angular adjustment of the transducer within the frame 90. The arrangement of the housing, motor, and other parts not shown in Figures 16 and 17 will be understood by reference to Figures 2-4.

The complete seismometer structure as above described and indicated at 99 in Figure 15 has an output which is preferably divided and which therefore is connected with two branches 101, 102 each branch containing a preamplifier 103 and a band pass filter 104, 105 respectively. One of said band pass filters passes only a frequency band which contains frequencies not differing too widely from the frequency of rotation. This band pass filter therefore passes the oscillation which is illustrated in Figure 14B, but rejects other frequencies and especially the much lower frequency of the signals produced by the components which are acting in the direction of the axis of rotation. This branch 101, moreover, in the event that the axis of rotation is not vertical, may be provided with a gravity wave extractor 108 such as before described in the shape of a generator or oscillator producing an E. M. F. counteracting the E. M. F. produced in the transducer by the action of gravity. This branch finally leads to the conventional photographic galvanometer record or oscillograph 110 which records the wave components acting in the plane of rotation.

The second branch 102 contains a low pass filter 105 with a cut off frequency which is well below the frequency of rotation and which will therefore only pass an oscillation of the frequency and wave form illustrated in Figure 14C, but will reject all frequencies which are higher and are in the neighborhood of the frequency of rotation. The output from the filter is then recorded in a recording unit 111.

The advantages which may be derived from the use of a rotating inertia reactor and transducer have already been explained. The additional advantages which may be derived from the use of a transducer which is inclined with respect to the axis of rotation will be apparent from the diagram and its description which shows that a new detection system may be introduced which eliminates practically all the limitations imposed on the known methods. Moreover, the adjustability of the inclination permits selection of the ratio of the response in different directions in accordance with the type of measurement which is the most interesting for the time being. The majority of the advantages which are obtainable are not obtainable by any of the known methods.

It will also be clear that forces or transients other than those mentioned may be recorded or measured with slight changes in the system which are obvious to the expert.

In Figs. 18 and 19, two further modifications of the invention are respectively shown. In these instances, the modifications consist of adaptations of different types of transducers as substitutes for the magnet-coil type common to the disclosure of Figs. 1–17. Hence it will be understood that the inventions of Figs. 18 and 19 are adaptable substitutes for any of the forms of instruments previously described herein.

In Fig. 18, a transducer employing the piezoelectric effect is shown and in Fig. 19 a transducer is shown employing the magnetostrictive effect, both forms being adapted to the rotational principle common to all forms of the invention. These two modified forms of the invention are likewise useful for seismic measurements, but are relatively more adapted to the measurement of minute differences in steady forces, such as gravity. Thus they may be aptly termed rotating accelerometers.

Fig. 18 shows the same housing 14 and shaft arrangement 20 already described for Figs. 2–4, which will not be described again in detail. In Fig. 18, within the internally threaded cylinder 25 is retained an externally threaded body 26a, the threading being for adjustment purposes to match the center of mass of the inner elements in body 26a with the center of rotation of shaft 20.

Body 26a is provided at one end with a cap 120 secured to the body by bolts 121, providing in effect a hermetical seal to minimize the effects of air turbulence on the parts within.

Centrally within body 26a is disposed a weight or mass 125, preferably composed of non-magnetic material having a low coefficient of expansion with respect to temperature. Weight 125 is clamped in body 26*a* between a pair of matched piezoelectric transducer systems consisting of piezoelectric crystals 126 oriented with their sensitive directions parallel to the long axis of weight or mass 125. Four electrodes 127—128 plate the crystal faces, and four insulating discs 130 separate the electrodes and crystals from the weight 125 and the inner walls of body 26*a*. Outer electrodes 127 are electrically connected by conductor 131, and inner electrodes 128 are connected to conductors 53*b* leading through a bore 132 to the usual slip ring arrangement previously described. Detailed means for hermetically sealing cap 120 and bore 132 are not shown.

The plus and minus signs on the crystals indicate similar piezoelectric directions, or the polarity of the crystals. In operation the transducer is rotated, as before, at a constant speed by motor means not shown in Fig. 18. The crystals are, it will be observed, connected in series so that when each is subjected to identical force the E. M. F.'s generated at the crystal terminals will oppose and cancel, but when opposite forces are active at each crystal the generated E. M. F.'s will add. Forces acting on the system of Fig. 18 such as temperature change, accordingly must compress or elongate both crystals together and such forces will not affect the readings because the effects cancel.

On the other hand, externally applied forces such as gravity or seismic activity tend to elongate one crystal while compressing the other, when these forces are directed axially with respect to the mass crystal system, hence their changes will add to produce across the slip rings double the voltage of a single crystal. In addition to canceling the effect of temperature changes the arrangement also acts to cancel the effects of the bending moment in the crystal due to forces acting perpendicular to the axis of the mass crystal system.

If the system is to be used as a seismometer or vibration meter its output, when the plane of rotation is essentially horizontal, must be fed through an amplifier and thence to an oscillograph or an oscilloscope similar to the case for the horizontally rotating seismometer having the velocity type transducer. If the plane of rotation is vertical or essentially non-horizontal, a source of alternating, counter-E. M. F. having the same frequency as the seismometer must be applied to reduce the gravity-generated wave to the point where the transients are readable. This is again similar to the situation for the non-horizontally rotating, velocity type seismometer previously described.

Where it is the gravity force itself that is to be measured, or another steady force, the plane of rotation will be oriented so as to contain the resultant force and the force will be given in terms of the amplitude of the generated, alternating E. M. F. For this purpose it will be most practical if the variable output generators supplying the counter E. M. F. are calibrated as to output so that the amount of E. M. F. required to effect cancellation of the signal put out by the accelerometer will be known. The gravity or other force difference will then be read in terms of the output of the calibrated counter-generator when the null point, as determined from an oscilloscope or other means, has been reached.

The essence of this form of the invention lies in the rotation of a force-sensitive transducer in which the geometry and the hookup is such that temperature and torque effects cancel; in which provision is made for balancing the inertia reactor across the axis of rotation so that differences in rate of rotation are not effective; and in which provision is made for hermetically sealing the sensitive unit to prevent barometric and turbulence effects.

In Fig. 19 is shown a device very similar to that of Fig. 18, except for the substitution of the magnetostrictive elements 135 for the crystals 120. The elements 135 are balanced in a manner similar to the crystals, and the E. M. F. generated by forces being measured is inductively picked up by coils 136 leading to the conductors 53*c*. In this view, a core or frame for holding the coils 136 is not shown but should obviously be present to prevent any contact between the coils and the inertia system. Coils 136, as shown, should be multi-turn coils wound concentric with the axis of the inertia system.

The mode of operation and characteristics of the Fig. 19 device is similar to that described for Fig. 18 above.

Figure 20 of the drawings shows, in schematic form, the combination of a transducer of the Figure 18 type, that is, one using a massive element 125 contacting at both ends respective piezoelectric elements 126, but incorporated in a driving system of the Figure 13 type so that its sensitive axis lies at an angle between shaft 7 and the perpendicular thereto.

What is claimed is:

1. A device of the class described for the detection and measurement of external forces, comprising at least one inertia-type sensing couple having a sensitivity to external forces which varies in relation to the direction of action of said forces upon said couple, power means for rotating said sensing couple about an axis inclined to the axis of maximum sensitivity of said couple, and means for indicating variations in the output of said couple during rotation thereof by said power means, the output of said couple thus measuring the response of said couple to said forces as modified by the variable directional sensitivity caused by the rotational speed of said couple.

2. A device of the class described for the detection and measurement of external forces, comprising a casing, at least one inertia-type sensing couple in said casing and sensitive to accelerations in a predetermined geometrical direction with respect thereto, means mounting said couple for rotation in said casing about an axis different from said direction, power means for rotating said sensing couple at a predetermined speed about said axis, and means for continuously measuring the output of said couple during its rotation.

3. The device according to claim 3, wherein the transducer includes a permanently magnetic inertia reactor element resiliently supported for free vibration, and a coil surrounding said reactor element, said coil being connected to the indicating means.

4. The device according to claim 2, wherein the transducer includes an inertia element mounted between a pair of piezoelectric crystals.

5. The device according to claim 2, wherein the transducer includes an inertia element mounted between a pair of magnetostrictive elements.

6. Apparatus for detecting and measuring gravitational forces, seismic waves and the like, comprising a transducer including an inertia element for producing electrical output from said transducer in response to variations in the external forces on said inertia element, means for rotating said inertia element at substantially constant speed about an axis inclined to the directional axis of said transducer, and means for measuring the output of said transducer.

7. A detecting and measuring device comprising an inertia-type sensing couple having a predetermined axis of maximum sensitivity, means for rotating said couple about a rotational axis at substantially constant speed, means for adjusting the angular relationship between said axis of maximum sensitivity and said rotational axis, and means for measuring the output of said sensing couple.

8. A detecting and measuring device comprising an inertia-type sensing couple having a directional axis, and means for rotating said sensing couple at substantially constant speed about a rotational axis lying between said directional axis and a direction perpendicular thereto.

9. A device of the class described for the detection and measurement of external forces, comprising a casing, a pair of inertia type sensing couples in said casing each sensitive to accelerations in a predetermined geometrical direction with respect thereto, means mounting each of said couples for rotation in said casing about an axis different from said respective directions, power means for rotating said sensing couples at predetermined identical speeds about their said axes in opposite directions, and means for continuously measuring the difference in the outputs of said couples during their rotation.

10. A device in accordance with claim 9, in which said couples are rotated about axes which are spaced apart but parallel to one another.

11. Apparatus for detecting and measuring, comprising an inertia-type sensing element, means for rotating said element at substantially constant speed to provide an output varying periodically with time and including components due to external forces acting on said element superimposed upon components of frequency corresponding to the speed of rotation, means for neutralizing certain of said components in the output of said element, and means for measuring the resulting output constituting the other components.

12. Apparatus in accordance with claim 11 in which said means for neutralizing comprises generating means energized by the means for rotating said sensing element.

13. Apparatus for measuring, comprising an electromechanical inertia-type transducer, means for rotating said transducer at substantially constant speed, whereby to produce an electrical waveform representing forces or accelerations to be measured, means responsive to forces in predetermined directions for generating waveforms corresponding to transient disturbances in the output of said transducer, and means for measuring the differences between said waveforms thereby to cancel the effect of said disturbances.

14. Apparatus for simultaneously measuring the effects of forces acting in different directions, comprising an electromechanical transducer having a directional axis, means for rotating said transducer about an axis acutely inclined to said directional axis at a substantially constant speed, whereby the output of said transducer includes components produced by said respective forces, filter means for separating the output of said transducer into components corresponding to said respective forces, and means for measuring said last-named components.

15. In combination, a vertically oriented rotating seismometer for producing an output wave including components due to vertical and horizontal transient forces and to the force of gravity, a counter-E. M. F. generator, a stationary vertically polarized seismometer, means for modulating the output of said generator by the output of said stationary seismometer, means for adjusting the degree of such modulation, means for combining the output of said modulating means with the output of said rotating seismometer in phase opposition, and means for measuring the resultant product of said combining means.

NEAL J. SMITH.
ROBERTA I. SMITH.

References Cited in the file of this patent

UNITED STATES PATENTS

| Number | Name | Date |
|---|---|---|
| 1,823,326 | Legg | Sept. 15, 1931 |
| 2,297,251 | Schild | Sept. 29, 1942 |